(12) United States Patent
Branecky

(10) Patent No.: US 6,653,811 B2
(45) Date of Patent: Nov. 25, 2003

(54) SWITCHED RELUCTANCE MOTOR AND METHOD AND APPARATUS FOR ALIGNING THE ROTOR THEREOF

(75) Inventor: Brian Thomas Branecky, Oconomowoc, WI (US)

(73) Assignee: A. O. Smith Corporation, Milwaukee, WI (US)

(*) Notice: Subject to any disclaimer, the term of this patent is extended or adjusted under 35 U.S.C. 154(b) by 58 days.

(21) Appl. No.: 09/925,051

(22) Filed: Aug. 8, 2001

(65) Prior Publication Data

US 2003/0030405 A1 Feb. 13, 2003

(51) Int. Cl.[7] ................................................ H02P 6/20
(52) U.S. Cl. ...................... 318/701; 318/254; 318/431
(58) Field of Search ................................. 318/138, 254, 318/430, 431, 439, 700, 701, 720, 721

(56) References Cited

U.S. PATENT DOCUMENTS

| 4,215,302 A |   | 7/1980 | Chiang |         |
|-------------|---|--------|--------|---------|
| 4,565,957 A | * | 1/1986 | Gary et al. | ................ 318/723 |
| 4,575,652 A |   | 3/1986 | Gogue |         |
| 4,698,537 A |   | 10/1987 | Byrne et al. |       |
| 4,772,839 A |   | 9/1988 | MacMinn et al. |    |
| 4,814,677 A | * | 3/1989 | Plunkett | ................ 318/254 |
| 5,010,267 A |   | 4/1991 | Lipo et al. |       |
| 5,140,243 A |   | 8/1992 | Lyons et al. |      |
| 5,446,354 A | * | 8/1995 | Hiruma | ................ 318/439 |
| 5,459,385 A |   | 10/1995 | Lipo et al. |      |
| 5,497,064 A |   | 3/1996 | Van Sistine |      |
| 5,518,373 A | * | 5/1996 | Takagi et al. | ................ 417/45 |
| 5,525,886 A |   | 6/1996 | Lyons et al. |     |
| 5,719,456 A |   | 2/1998 | Kolomeitsev |      |
| 5,737,164 A |   | 4/1998 | Ferreira et al. |  |
| 5,844,343 A |   | 12/1998 | Horst |           |
| 5,936,322 A |   | 8/1999 | Yamaguchi et al. |  |
| 5,969,454 A |   | 10/1999 | Pengov et al. |   |
| 6,153,956 A |   | 11/2000 | Branecky |        |
| 6,448,736 B1 | * | 9/2002 | Lajsner et al. | ................ 318/701 |

* cited by examiner

*Primary Examiner*—Bentsu Ro
(74) *Attorney, Agent, or Firm*—Michael Best & Friedrich

(57) ABSTRACT

The method and apparatus for aligning the rotor of a switched reluctance motor includes regulating the electrical energy provided to two phases of the motor so that the rotor pole is moved to a desired position virtually without oscillation. Regulation of the electrical energy is based on an error signal produced by comparing a sensed current signal and a reference signal. If there is no overlap between the rotor pole and stator poles, the encoder is homed when the rotor is at a known position. If there is overlap, the rotor is moved to an aligned position by reducing the duty cycle command of one phase until all the electrical energy provided to the two phases is in the phase having a constant duty cycle. The rotor is then aligned with a stator pole of the phase with all the electrical energy and the encoder is homed.

44 Claims, 3 Drawing Sheets

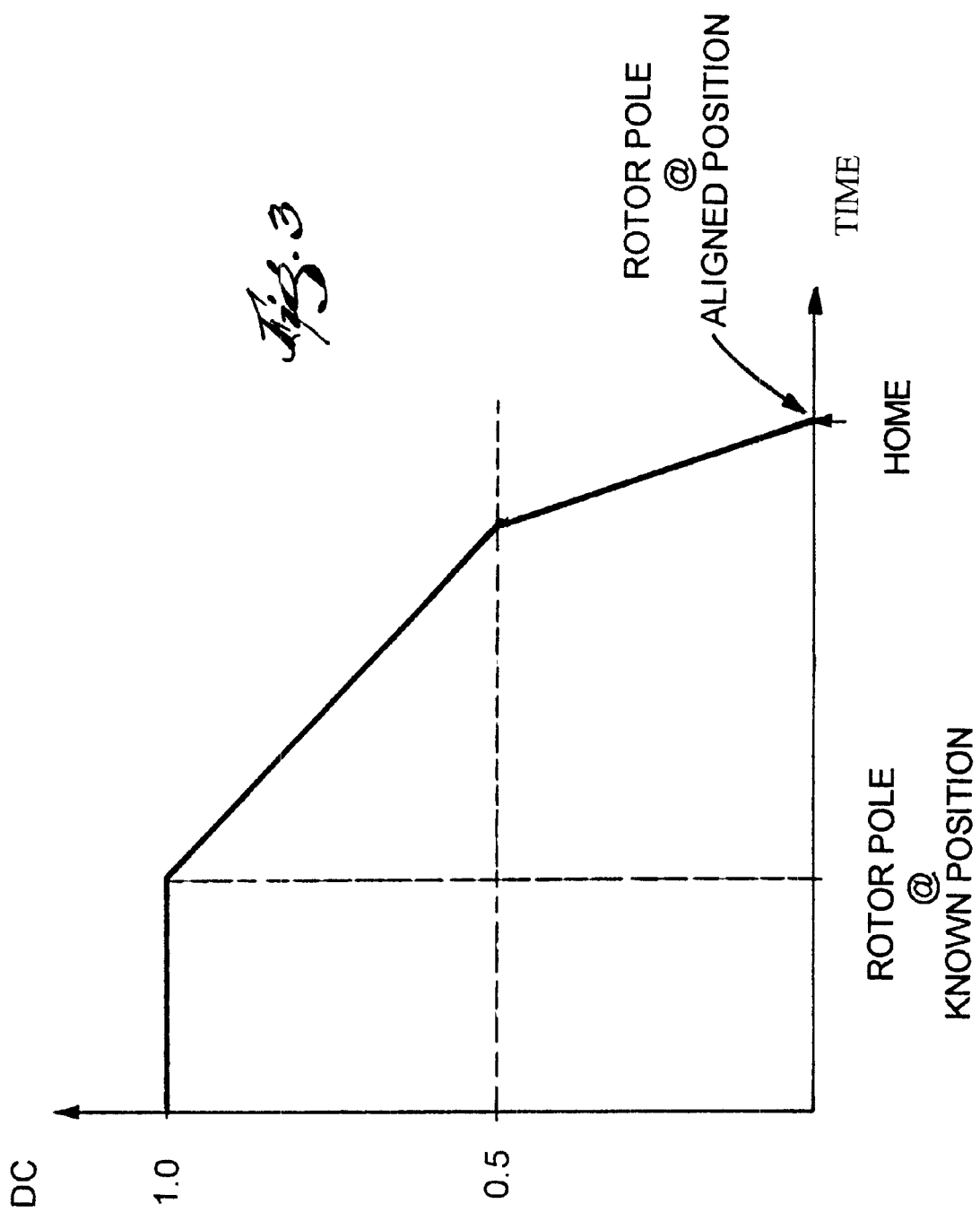

SWITCHED RELUCTANCE MOTOR AND METHOD AND APPARATUS FOR ALIGNING THE ROTOR THEREOF

BACKGROUND OF THE INVENTION

The invention relates to a switched reluctance ("SR") motor. More particularly, the invention relates to a method and apparatus for aligning the rotor of an SR motor.

SR motors have multiple poles on both the stator and the rotor. There are windings or coils wound on the stator poles and each pair of windings on diametrically opposite stator poles are connected in series to form an electrically independent phase of the SR motor. There are no windings or magnets on the rotor. However, the rotor is made of a magnetically permeable material such as, for example, a ferrous alloy.

In order to start and run an SR motor, it is necessary to determine the position of the rotor with respect to the stator. The position of the rotor with respect to the stator establishes which phase of the stator is energized or commutated first. If the position of the rotor is not correctly determined, commutation of one of the stator phases may result in inefficient or improper operation of the motor.

Many conventional sensors for determining rotor position exist. Some conventional sensors utilize an encoder. When using an encoder without a home pulse, the homing of the encoder must be done before the SR motor is run. To accomplish homing, the rotor is moved into a desired position and the counter for the encoder is set to a value equivalent to the desired position. Generally, the most accurate position the rotor can be moved to for homing is an aligned position, i.e., when a rotor pole and a stator pole are aligned. The rotor can also be moved to any known position for homing, the most common known position is halfway between two stator poles.

SUMMARY OF THE INVENTION

Moving a rotor pole into a desired position is often accomplished by energizing a single phase of the motor. When a single phase of the motor is energized, current flows through a winding on a stator pole of the energized phase and produces a magnetic field. The magnetic field attracts a rotor pole that moves toward the stator pole of the phase that has been energized. When the rotor pole moves into alignment with the stator pole there is often enough inertia to keep the rotor pole moving right past the aligned position. A pendulum-type motion results. The duration of the oscillatory movement depends upon the ratio of inertia to friction, or the damping ratio. Oscillatory movement can continue upwards of ten to fifteen seconds in some applications where SR motors are used (e.g., some types of blowers). In devices with higher damping ratios the duration of the oscillatory movement may be much shorter. Once the oscillatory movement has ceased, the rotor pole will be aligned with the stator pole (i.e., aligned position) and the encoder can be homed.

Another way of moving a rotor pole into a desired position is accomplished by simultaneously energizing two phases of the motor independent of each other. This method is similar to the method discussed above of energizing a single phase of the motor except that it is equivalent to having a two point gravity source and therefore only widens the oscillatory movement. This method typically results in a longer decay time than the single phase energized method. Once the oscillatory movement has ceased, the rotor pole will be aligned halfway between the two energized stator poles (i.e., known position).

Other ways of moving a rotor pole into a desired position that result in oscillatory movement of the rotor are not acceptable for applications where a fast response of the motor is required. The time that the oscillatory motion takes to decay delays homing of the encoder and therefore delays operation of the motor.

Accordingly, the invention provides a way of moving a rotor pole into a desired position with little to no oscillation. The automatic feedback method of the present invention simultaneously energizes two phases of the motor using a combined current method. Instead of controlling each phase current independently, the sum of the phase currents is controlled resulting in the natural damping of the oscillations. The rotor gently moves into a desired position with little to no oscillation. When two phases are energized in this manner, the rotor pole will come to rest halfway between two stator poles corresponding to the two phases that are energized.

An encoder can be homed at a position halfway between two stator poles if that position can be accurately determined. However, a problem that can be encountered when a rotor is aligned halfway between two stator poles is that the measurement of the inductance present in each of the phases may not be accurate enough to home the encoder. This problem is often encountered when high efficiency motors are used. High efficiency motors generally utilize differing degree stator arcs and rotor arcs (for example, a 30 degree stator arc and a 32 degree rotor arc). The overlap resulting from the differing arcs of the stator and the rotor typically do not cause great enough differences in inductance measurements to accurately home the encoder for efficient operation of the motor.

Accordingly, to alleviate this problem when it exists, the invention further provides a way of gently moving the rotor pole from a known position to an aligned position. A time based multiplier is utilized to adjust the duty cycle command of one of the phases, this allows the current to be reduced in that phase until all the current is in one phase only. To prevent the introduction of oscillatory movement, the time based multiplier waits until after the rotor has come to rest half way between two stator poles or has only minimal movement before adjusting the duty cycle The rotor will rotate to the stator pole of the phase with all the current. When the rotor pole and stator pole are aligned they will be in an aligned position. When the rotor pole is in the aligned position the encoder can be accurately homed.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a graphical illustration of a duty cycle command waveform embodying the invention.

Figure 1:
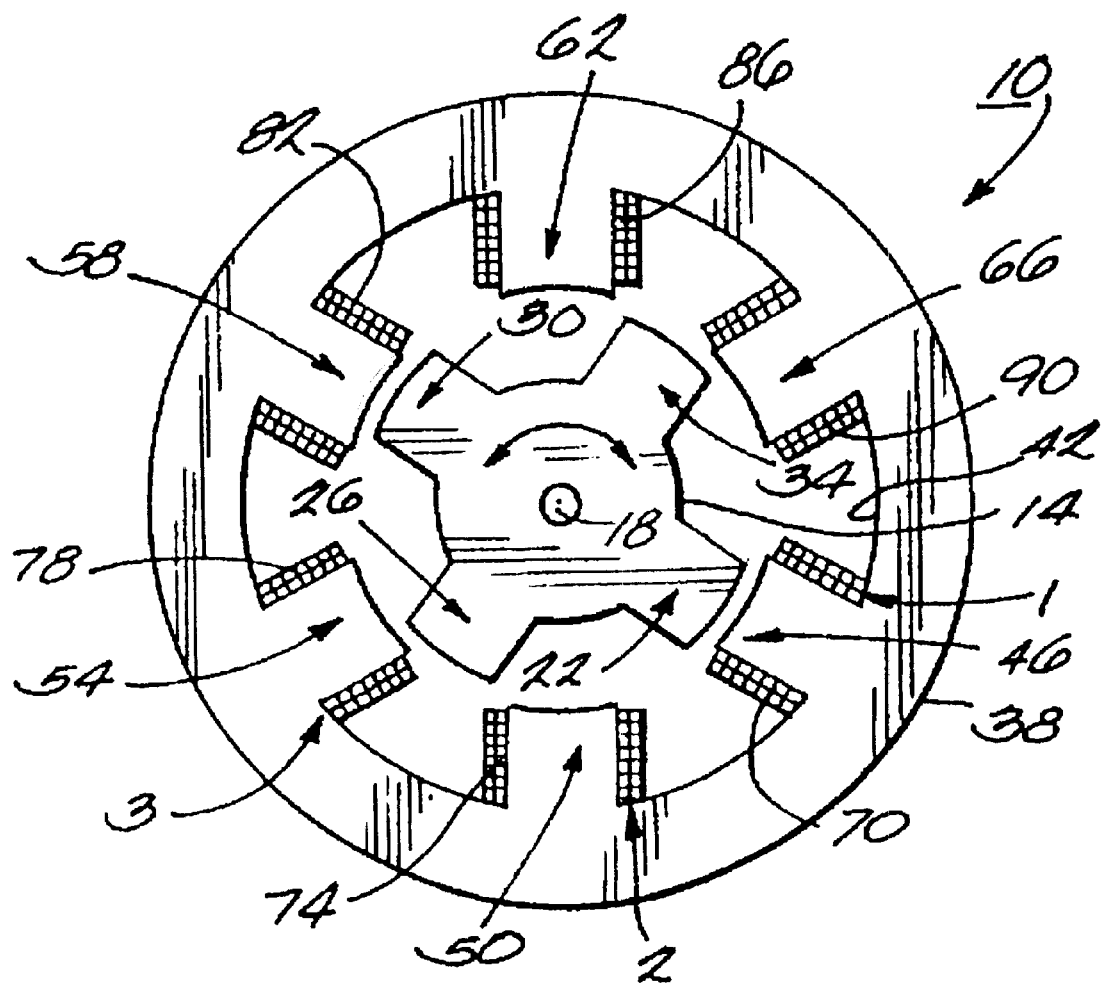
FIG. 1 is a simplified cross-sectional representation of a switched reluctance motor embodying the invention.

Before the embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" and variations thereof herein is meant to encompass only the items listed thereafter and the equivalents thereof. The use of letters to identify steps of a method or process is simply for identification and is not meant to indicate that the steps should be performed in a particular order.

DETAILED DESCRIPTION OF THE PREFERRED EMBODIMENTS

FIG. 1 illustrates a schematic view of a switched reluctance motor 10 embodying the invention. The switched reluctance motor 10 includes a rotor 14 mounted for rotation about an axis 18. The rotor 14 includes four rotor poles 22, 26, 30 and 34. The rotor poles 22, 26, 30, and 34 are evenly spaced about the axis 18 and extend radially outward from the rotor 14 relative to the axis 18.

The motor 10 also includes a stator 38 surrounding the rotor 14. The stator 38 has an inner surface 42 and six stator poles 46, 50, 54, 58, 62 and 66, extending from the inner surface 42 inwardly toward the rotor axis 18. The stator poles 46, 50, 54, 58, 62 and 66 are evenly spaced about the inner surface 42 of the stator 38. Because the motor 10 includes six stator poles and 4 rotor poles, the switched reluctance motor 10 shown in FIG. 1 is referred to as a 6/4 (6 stator pole to 4 rotor pole ratio) switched reluctance motor. While the description will refer to the operation of the invention in terms of a 6/4 SR motor, it should be understood that any switched reluctance motor having any number of stator poles or rotor poles can be controlled with the circuit disclosed herein.

The SR motor 10 also includes windings or coils 70, 74, 78, 82, 86 and 90, on the stator poles 46, 50, 54, 58, 62 and 66, respectively. The windings are made of a conductor of a precise gauge which is wound around the stator pole a precise number of times or turns. The gauge of the wire and the number of turns vary depending upon the application. The description applies equally to any SR motor using any gauge wire or having any number of turns.

The windings 70, 74, 78, 82, 86 and 90, on diametrically opposite stator poles 46, 50, 54, 58, 62 and 66, respectively, are connected in series to form three electrically independent phases 1, 2 and 3 of the SR motor 10. As shown in FIG. 1, the windings 70 and 82 on stator poles 46 and 58, respectively, form pole pairs which together form phase 1. The windings 74 and 86 on stator poles 50 and 62, respectively, form pole pairs which together form phase 2. The windings 78 and 90 on stator poles 54 and 60, respectively, form pole pairs which together form phase 3. Because the rotor 14 is made of ferromagnetic material, energizing a particular phase of the motor 10 results in the formation of a magnetic attraction between the windings on the stator pole pairs comprising the energized phase and the rotor poles closest to the stator poles of the energized phase. By energizing the phases in a particular manner, the rotational direction and speed of the rotor can be precisely controlled.

Although the preferred embodiment of the invention is practiced using an SR motor, the invention can be practiced using any type of motor that includes a rotor that needs to be aligned prior to starting the motor.

Figure 2:
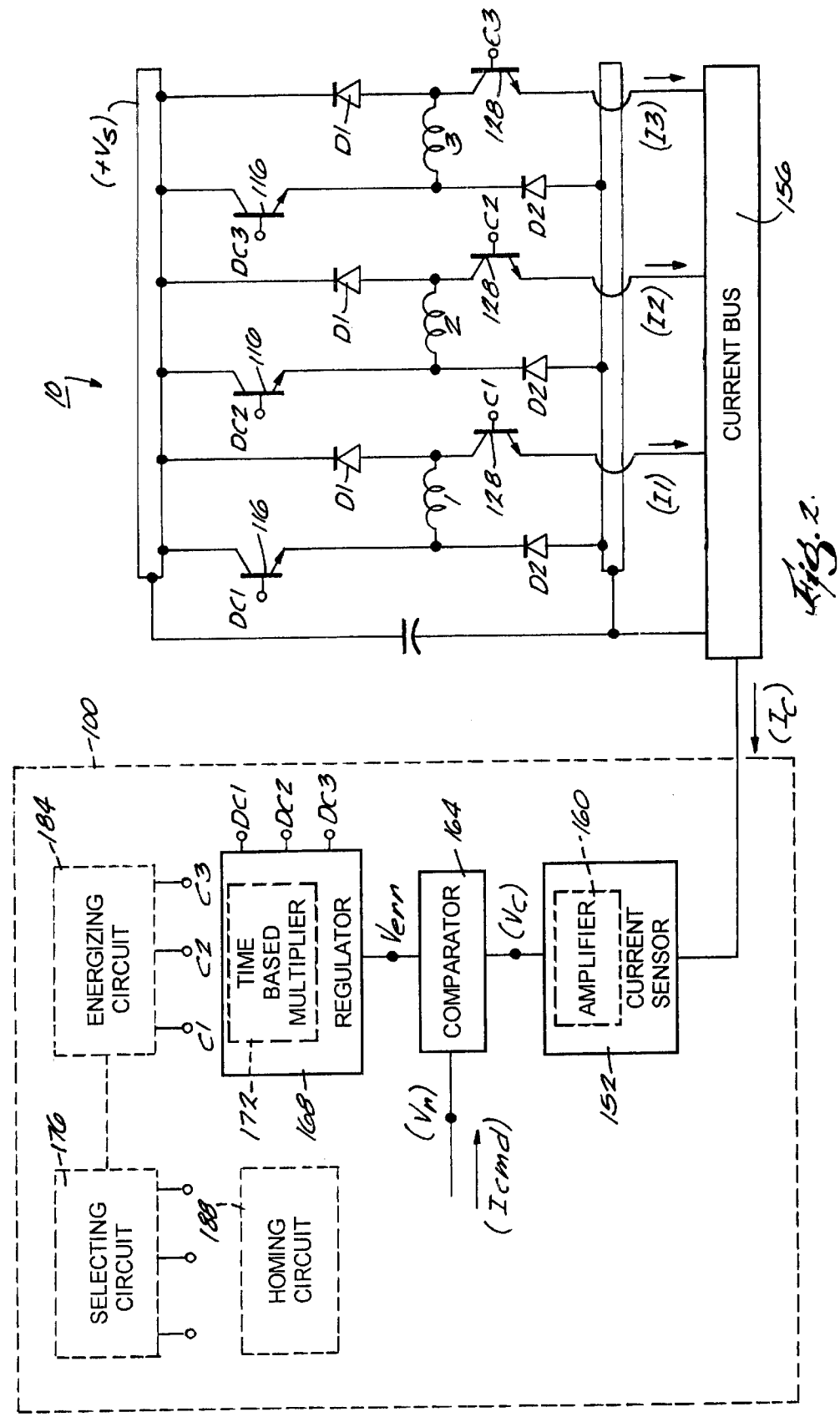
FIG. 2 is a schematic diagram of the motor of FIG. 1, and including a control circuit for aligning the rotor of the motor.

As shown in greater detail in FIG. 2, each of the phases 1, 2 and 3 is connected to switching and control circuitry for selectively energizing the phases in response to control signals. The switching and control circuitry is identical for each of the phases 1, 2 and 3, and accordingly, only the circuitry connected to phase 1 will be described in detail. Like parts are identified using like reference numerals.

The motor includes a positive voltage bus ($+V_S$). The first switching transistor 116 is connected to the voltage bus ($+V_S$) through the emitter thereof and to a first end of phase 1 through the collector thereof. The other end of phase 1 is connected to the anode of a diode D1 which in turn has a cathode connected to the positive voltage bus ($+V_S$). The first end of the phase 1 is also connected to the cathode of a diode D2 which includes an anode connected to a negative voltage bus ($-V_S$). The motor includes a second switching transistor 128 connected to the other end of phase 1 through the emitter thereof and to a negative current bus 156 through the collector of switch 128. Negative current bus 156 is connected to negative voltage bus ($-V_S$). The current bus 156 adds or combines the currents I1, I2 and I3 flowing out of the phases 1, 2 and 3, respectively.

As shown in FIG. 2, the motor 10 also includes a control circuit 100 for aligning the rotor 14 of the motor 10. The circuit 100 includes a current sensor 152 connected to the current bus 156. Current sensor 152 senses the combined current $I_C$ flowing through the three phases 1, 2 and 3. Any conventional current sensor is appropriate to sense the combined current $I_C$ of the phases 1, 2 and 3. The current sensor 152 outputs voltage ($V_C$) that is proportional to the combined current $I_C$ flowing through the current bus 156. Preferably, the current sensor 152 also includes an amplifier 160 that amplifies the sensed current voltage ($V_C$) to a magnitude that is appropriate for later use.

The circuit 100 also includes a comparator 164 that is responsive to the sensed current voltage ($V_C$). The comparator 164 compares the magnitude of the sensed current voltage ($V_C$) to the magnitude of a reference voltage ($V_R$) corresponding to a specified command current ($I_{CMD}$). The desired current or command current ($I_{CMD}$) is a defined value that depends upon a number of factors including the friction of the system and the characteristics of the motor. The reference voltage ($V_R$) is set dependent upon operating characteristics when the motor 10 is manufactured, or when the motor 10 is actually used in a particular application. If the operating characteristics of the motor 10 change, the reference voltage ($V_R$) is adjustable in a manner similar to the way it was originally set. The comparator 164 outputs an error voltage ($V_{ERR}$) that corresponds to the difference between the sensed current voltage ($V_C$) and the reference voltage ($V_R$).

The circuit 100 also includes a regulator 168 that is connected to the comparator 168 and that is responsive to the error voltage ($V_{ERR}$) output by the comparator 164. The regulator 168 outputs a duty cycle command DC1, DC2 and DC3, for each phase 1, 2 and 3, respectively, that corresponds to the error voltage ($V_{ERR}$). The regulator 168 changes a voltage signal into a square wave signal having a duty cycle proportional to the voltage and at a fixed switching frequency. Thus, the regulator 168 acts as a switch controller by opening and closing the pulse width modulated switches 116 of the phases 1, 2 and 3. In a preferred embodiment, the duty cycle command DC1, DC2 and DC3 output by the regulator 168 for each phase that is energized during rotor alignment is equivalent (e.g., DC2=DC3).

The regulator 168 of the circuit 100 includes a time based multiplier 172. The time based multiplier 172 includes a factor, or multiplier, that is used to reduce the duty cycle command DC1, DC2, or DC2 of one of the phases 1, 2, or 3. For example, when the duty cycle command DC2 output by the regulator 168 for phase 2 is equal to 0.9 and the factor is 0.5, the adjusted value of the duty cycle command DC2 is 0.45 (half what it otherwise would be), thereby reducing the output of the phase being controlled by the reduced duty cycle command. The time based multiplier 172 is utilized when the rotor 14 is moved from a known position halfway between two stator poles to an aligned position. The time based multiplier 172 reduces the duty cycle command DC1, DC2 or DC3 of one of the phases 1, 2 or 3, respectively, until the duty cycle command of that phase is null. If the factor introduced by the time based multiplier 172 is reduced too quickly, the rotor will begin to oscillate. In contrast, if the factor introduced by the time based multiplier 172 is reduced too slowly, the time it takes to move the rotor to an aligned position may take longer than the time it takes for oscillatory movement to decay using known methods of moving the rotor to a desired position. For optimal timing, the multiplier should be reduced slowly at first, and then reduced quickly at the end. FIG. 3 graphically illustrates a duty cycle command waveform. The waveform illustrates the different rates of reducing the duty cycle command dependent upon where the rotor pole is with respect to the stator poles.

When a rotor pole is halfway between two stator poles of a motor with overlapping pole tips, the rotor pole will overlap the stator pole only by a couple of degrees. At this point the forces pulling the rotor into alignment with each stator pole are great, so reducing the multiplier slowly at this point is critical to minimize oscillatory movement. Once the multiplier is reduced to 0.5 (at this point the rotor pole will overlap the stator pole of the phase having a constant duty cycle and the overlap will equal half of the arc length of the rotor pole), the force pulling the rotor pole into alignment with the stator pole of the phase whose duty cycle command is being adjusted has been reduced so increasing the rate of reduction of the multiplier will not cause oscillatory movement of the rotor but it will drastically reduce the time to alignment of the rotor at the aligned position. In a preferred embodiment, reducing the multiplier introduced by the time based multiplier 172 does not result in oscillatory movement that would delay alignment of the rotor.

In some applications, such as some compressors, rotation of the rotor in a direction opposite the normal direction of travel may adversely affect the motor 10. Therefore, the time based multiplier 172 should reduce the duty cycle command of the phase that is behind the normal direction of travel of the rotor, thereby causing the rotor to move to the first aligned position in the normal direction of travel. Accordingly the time based multiplier 172 may be responsive to a signal that designates which of the two phases is in the direction of rotor 14 travel.

The circuit also includes a selecting circuit 176 connected to the phases 1, 2, and 3. The selecting circuit 176 determines which two of the phases 1, 2 and 3, to energize in order to align the rotor 14 to a desired position. Alignment of the rotor 14 to a desired position is most efficient if the rotor 14 is aligned to the desired position nearest to where a rotor pole 22, 26, 30 or 34, is currently at rest. One embodiment of a selecting circuit 176 is described in U.S. Pat. No. 5,497,064, which is assigned to the assignee of this application and which is incorporated herein by reference. The selecting circuit 176 described in U.S. Pat. No. 5,497,064 includes a pulse generator (not shown) that supplies a seek current to each of the phases 1, 2 and 3, of the motor 10 without causing rotation of the rotor 14. The seek currents in the phases 1, 2 and 3, each have a respective seek current rise time. The rise time is a function of the proximity of the rotor poles 22, 26, 30 and 34, to the respective phases 1, 2 and 3. The selecting circuit 176 includes a series of counters (not shown) for measuring the amount of time required for the seek current in each phase to reach a predetermined seek current threshold and a comparator (not shown) for comparing the seek current rise times and for establishing a priority sequence determined by which of the phases has the lowest seek current rise time, the intermediate seek current rise time, and the highest seek current rise time. The selecting circuit 176 also includes an output that is utilized to energize the two selected phases in order to efficiently align the rotor 14 to a desired position.

The circuit 100 also includes an energizing circuit 184 connected to the selecting 176 circuit and to commutation switches 128 of the phases 1, 2, and 3. The energizing circuit 184 energizes the phases 1, 2 and 3, at appropriate times by closing the respective commutation switch 128 and instructing the regulator 168 to produce a duty cycle command for the pulse width modulated switch corresponding to the respective phase to be energized. Closing the commutation switch and regulating the pulse width modulated switch couples the phase to the power source (not shown) that supplies the positive supply voltage ($+V_S$) and the negative supply voltage ($-V_S$). The energizing circuit 184 is also responsive to the selecting circuit 176.

The circuit 100 also includes a homing circuit 188 connected to phases 1, 2, and 3 and to the encoder (not shown). The homing circuit 188 homes the encoder (not shown) after the rotor 14 is aligned to either a known position or an aligned position. When the rotor 14 is aligned, the counter (not shown) for the encoder is set to a value equivalent to the known or aligned position.

In operation, when the rotor 14 is at rest and the power switch (not shown) of the motor 10 is turned on, the selecting circuit 176 determines which two of the three phases to energize in order to align the rotor to a desired position. By way of example, if the motor 10 illustrated in FIG. 1 was turned on, the selecting circuit 176 would likely determine that the most efficient way to move the rotor 14 to a desired position would be to move rotor pole 34 to the known position halfway between stator poles 62 and 66. Rotor pole 34 is the rotor pole that is nearest to the known position halfway between two stator poles and therefore would have the shortest distance to rotate to be aligned at the known position. Accordingly, the two phases selected by the selecting circuit 176 would be phases 2 and 3. The output corresponding to the two selected phases 2 and 3 is then utilized by the energizing circuit 184 to energize the selected phases 2 and 3.

The energizing circuit 184 energizes the selected phases 2 and 3 by closing the respective commutation switches 128 of the selected phases 2 and 3 and instructing the regulator 168 to produce duty cycle commands DC2 and DC3 to control the respective pulse width modulated switches 116 of the selected phases 2 and 3. The value of the duty cycle commands DC2 and DC3 will be adjusted dependent upon the magnitude of the error voltage ($V_{ERR}$) output by the comparator 164. Once phases 2 and 3 have been energized, currents I2 and I3 flowing through phases 2 and 3 are summed in the current bus 156. The combined current Ic (I1=0 when phase 1 is not energized) flows through the current sensor 152 and produces the sensed current voltage ($V_C$). The sensed current voltage ($V_C$) is amplified by the amplifier 160 before output if necessary. The sensed current voltage ($V_C$) is compared by the comparator 164 to the reference voltage ($V_R$) that corresponds to the command current ($I_{CMD}$). The comparator 164 outputs the error voltage ($V_{ERR}$) that the regulator 168 is responsive to in order to adjust the duty cycle commands DC2 and DC3 that open and close the pulse width modulated switches 116 of phases 2 and 3.

After energizing phases 2 and 3 the inductance in phases 2 and 3 is measured. If the rotor pole 34 is centered between stator poles 62 and 66, the inductance in phase 2 will equal the inductance in phase 3. Accordingly, the current I2 flowing through phase 2 will equal the current I3 flowing through phase 3. If rotor pole 34 is closer to stator pole 66 as illustrated in FIG. 1, the inductance in phase 2 (phase 2 includes the winding 86 on stator pole 62) is less than the inductance in phase 3 (phase 3 includes the winding 90 on stator pole 66). Accordingly the current I2 flowing through phase 2 is greater than the current I3 flowing through phase 3 decreases. If the current I2 is greater than the current I3 (assuming windings 86 and 90 are similar), the magnetic field produced by winding 86 on stator pole 62 is stronger than the magnetic field produced by winding 90 on stator pole 66. Accordingly, rotor pole 34 is attracted toward stator pole 62, and away from stator pole 66. As rotor pole 34 rotates toward the known position halfway between stator poles 62 and 66 (i.e., the halfway position), the inductance in each of the two phases 2 and 3 changes and the current I2 and I3 flowing through each of the selected phases also changes. As the currents I2 and I3 change, the magnetic fields produced also change thereby altering the degree to which the rotor pole 34 is attracted toward each stator pole 62 and 66. This natural automatic feedback method eliminates oscillatory movement of the rotor about the halfway position.

If there is no overlap between the rotor pole and stator poles, the encoder (not shown) can be homed at the known position. The homing circuit 184 homes the encoder by setting the encoder value to a value equivalent to the value of the position halfway between the two stator poles.

If there is overlap between the rotor pole and stator poles, the measurements of inductance in each of the two phases is not accurate enough to home the encoder. In such situations the rotor pole 34 must be moved into an aligned position.

When direction of rotation of the rotor 14 does not matter because the motor 10 is not adversely affected, the time based multiplier 172 may reduce the duty cycle command of either of the two selected phases to bring the rotor pole into alignment with the desired stator phase. However, if rotation of the rotor 14 in a direction opposite the normal direction of travel may adversely affect the motor 10, the time based multiplier 172 reduces the duty cycle command of the phase that is behind the normal direction of travel of the rotor, thereby causing the rotor to move to an aligned position that is in the normal direction of travel. For the motor 10 illustrated in FIG. 1, the normal direction of rotation of the rotor 14 is counterclockwise. Given the position of the rotor as shown, the time based multiplier 172 adjusts the duty cycle command DC3 of phase 3 until the duty cycle command DC3 is null. Reduction of the duty cycle command DC3 results in less current I3 flowing through phase 3, and therefore a weaker magnetic field produced by winding 90 on stator pole 66. As the current I3 is reduced, the current I2 flowing through phase 2 increases and a stronger magnetic field is produced by winding 86 on stator pole 62 so that rotor pole 34 will gently move into alignment with stator pole 62. Once the rotor pole 34 reaches a position that is accurate enough to home the encoder, the homing circuit 186 homes the encoder.

The embodiment of the invention described herein, provides a novel and useful method and apparatus for aligning the rotor of an SR motor without oscillation. Various features of the invention are set forth in the following claims.

What is claimed is:

1. In a motor having a rotor including at least one rotor pole and a stator including at least two phases, each phase having at least one stator pole, a method of moving the rotor to a desired position relative to the stator, the method comprising the acts of:

providing an electrical energy to two phases of the at least two phases of the motor;

sensing a combined current flowing through a current bus connected to the two phases;

regulating the electrical energy provided to the two phases in response to the sensed current so that the rotor pole is aligned at the desired position virtually without oscillation, wherein the desired position is a known position that is halfway between two stator poles; and moving the rotor from the known position to an aligned position virtually without oscillation, wherein the act of moving the rotor to an aligned position includes the act of reducing the electrical energy supplied to one of the two phases until no electrical energy is supplied to the one phase.

2. The method of claim 1, further comprising the act of producing a sensed current signal corresponding to the combined current sensed.

3. The method of claim 2, and further comprising the act of providing a reference signal corresponding to a current commanded.

4. The method of claim 3, and further comprising the act of comparing the sensed current signal to the reference signal and the act of producing an error signal based on the comparison.

5. The method of claim 4 wherein the act of regulating the electrical energy is based on the error signal.

6. The method of claim 1 wherein the aligned position is where the rotor pole is aligned with a stator pole of the other of the two phases.

7. The method of claim 6, and further comprising the act of homing an encoder when the rotor pole is aligned at the aligned position.

8. In a motor having a rotor including at least one rotor pole and a stator including at least two phases, each phase having at least one stator pole, a method of moving the rotor to a desired position relative to the stator, the method comprising the acts of:

providing an electrical energy to two phases of the at least two phases of the motor;

sensing a combined current flowing through a current bus connected to the two phases;

regulating the electrical energy provided to the two phases in response to the sensed current so that the rotor pole is aligned at the desired position virtually without oscillation; and homing an encoder when the rotor pole is at the desired position.

9. The method of claim 8 wherein the desired position is a known position that is halfway between two stator poles.

10. The method of claim 9, and further comprising the act of moving the rotor from the known position to an aligned position virtually without oscillation.

11. The method of claim 10 wherein the act of moving the rotor to an aligned position includes the act of reducing the electrical energy supplied to one of the two phases until no electrical energy is supplied to the one phase.

12. The method of claim 8 wherein the motor is a switched reluctance motor.

13. The method of claim 8, and wherein the combined current in the current bus includes the current flowing out of the two phases.

14. In a motor having a rotor including at least one rotor pole and a stator including at least two phases, each phase having at least one stator pole, a method of moving the rotor to a desired position relative to the stator, the method comprising the acts of:

provided an electrical energy to two phases of the at least two phases of the motor;

sensing a combined current flowing through a current bus connected to the two phases;

producing a sensed current signal corresponding to the combined current sensed;

providing a reference signal corresponding to a current commanded;

comparing the sensed current signal to the reference signal and producing an error signal based on that comparison; and regulating the electrical energy provided to the two phases based on the error signal so that the rotor pole is aligned at the desired position virtually without oscillation.

15. The method of claim 14, and further comprising the act of homing an encoder when the rotor pole is aligned at the desired position.

16. The method of claim 14 wherein the desired position is a known position that is halfway between two stator poles.

17. The method of claim 16, and further comprising the act of moving the rotor from the known position to an aligned position virtually without oscillation.

18. The method of claim 17 wherein the act of moving the rotor to an aligned position includes the act of reducing the electrical energy supplied to one of the two phases until no electrical energy is supplied to the one phase.

19. The method of claim 18 wherein the aligned position is where the rotor pole is aligned with a stator pole of the other of the two phases.

20. The method of claim 19, and further comprising the act of homing an encoder when the rotor pole is aligned at the aligned position.

21. The method of claim 14 wherein the motor is a switched reluctance motor.

22. The method of claim 14 wherein the combined current in the current bus includes the current flowing out of the two phases.

23. In a motor having a rotor including at least one rotor pole and a stator including at least two phases, each phase having at least one stator pole, a method of moving the rotor to an aligned position relative to the stator, the method comprising the acts of:

providing an electrical energy to two phases of the at least two phases of the motor;

sensing a combined current flowing through a current bus connected to the two phases;

producing a sensed current signal corresponding to the combined current sensed;

providing a reference signal corresponding to a current commanded;

comparing the sensed current signal to the reference signal and producing an error signal based on that comparison;

regulating the electrical energy provided to the two phases based on the error signal so that the rotor pole is aligned at a known position virtually without oscillation;

wherein the known position is halfway between two stator poles;

reducing the electrical energy supplied to one of the two phases until no electrical energy is supplied to the one phase so that the rotor pole is moved from the known position to the aligned position virtually without oscillation;

wherein the aligned position is where the rotor pole is aligned with a stator pole of the other of the two phases; and homing an encoder when the rotor pole is aligned at the aligned position.

24. The method of claim 23 wherein the motor is a switched reluctance motor.

25. The method of claim 23 wherein the combined current in the current bus includes the current flowing out of the two phases.

26. A control circuit for a motor having a rotor including at least one rotor pole and a stator including at least two phases, each phase having at least one stator pole, the circuit comprising:

a current sensor connected to the at least two phases of the motor, the current sensor including an output for outputting a sensed current signal indicative of the total current in the at least two phases;

a comparator having an input for receiving a reference signal corresponding to a desired current, an input for receiving the sensed current signal, and an output for outputting an error signal corresponding to a comparison of the reference signal and the sensed current signal; and a regulator having an input for receiving the error signal and at least one output for outputting at least one command signal for regulating electrical energy provided to the two phases so that the rotor pole is aligned at a desired position virtually without oscillation.

27. The control circuit of claim 26 wherein the current sensor includes an amplifier.

28. The control circuit of claim 26 wherein the regulator includes a time based multiplier, the time based multiplier having a factor that determines to what degree the at least one command signal is reduced.

29. The control circuit of claim 26, and further comprising a selecting circuit connected to the at least two phases, and wherein the selecting circuit is configured to determine two phases of the at least two phases to energize in order to align the rotor at the desired position.

30. The control circuit of claim 29, and further comprising an energizing circuit connected to the selecting circuit and the at least two phases, and wherein the energizing circuit is configured to energize the two phases determined by the selecting circuit.

31. The control circuit of claim 26, and further comprising a homing circuit connected to an encoder, the homing circuit configured to home the encoder when the rotor pole is at the desired position.

32. The control circuit of claim 26 wherein the desired position is a known position halfway between two stator poles.

33. The control circuit of claim 26 wherein the desired position is an aligned position where the rotor pole is aligned with a stator pole.

34. A control circuit for a motor having a rotor including at least one rotor pole and a stator including at least two phases, each phase having at least one stator pole, the circuit comprising:

a current sensor connected to the at least two phases of the motor, the current sensor including an output for outputting a sensed current signal indicative of the total current in the at least two phases;

a comparator having an input for receiving a reference signal corresponding to a desired current, an input for receiving the sensed current signal, and an output for outputting an error signal corresponding to a comparison of the reference signal and the sensed current signal;

a regulator having an input for receiving the error signal and at least one output for outputting at least one command signal for regulating electrical energy provided to the two phases so that the rotor pole is aligned at a desired position virtually without oscillation;

a selecting circuit connected to the at least two phases, and wherein the selecting circuit is configured to determine two phases of the at least two phases to energize in order to align the rotor at the desired position; and an energizing circuit connected to the selecting circuit and the at least two phases, and wherein the energizing circuit is configured to energize the two phases determined by the selecting circuit.

35. The control circuit of claim 34 wherein the current sensor includes an amplifier.

36. The control circuit of claim 34 wherein the regulator includes a time based multiplier, the time based multiplier having a factor that determines to what degree the at least one command signal is reduced.

37. The control circuit of claim 34, and further comprising a homing circuit connected to an encoder, the homing circuit configured to home the encoder when the rotor pole is at the desired position.

38. The control circuit of claim 34 wherein the desired position is a known position halfway between two stator poles.

39. The control circuit of claim 34 wherein the desired position is an aligned position where the rotor pole is aligned with a stator pole.

40. A control circuit for a motor having a rotor including at least one rotor pole and a stator including at least two phases, each phase having at least one stator pole, the circuit comprising:

a current sensor connected to the at least two phases of the motor, the current sensor including an output for outputting a sensed current signal indicative of the total current in the at least two phases;

a comparator having an input for receiving a reference signal corresponding to a desired current, an input for receiving the sensed current signal, and an output for outputting an error signal corresponding to a comparison of the reference signal and the sensed current signal;

a regulator having an input for receiving the error signal and at least one output for outputting at least one command signal for regulating electrical energy provided to the two phases so that the rotor pole is aligned at a desired position virtually without oscillation;

a selecting circuit connected to the at least two phases, and wherein the selecting circuit is configured to determine two phases of the at least two phases to energize in order to align the rotor at the desired position;

an energizing circuit connected to the selecting circuit and the at least two phases, and wherein the energizing circuit is configured to energize the two phases determined by the selecting circuit; and a homing circuit connected to an encoder, the homing circuit configured to home the encoder when the rotor pole is at the desired position.

41. The control circuit of claim 40 wherein the current sensor includes an amplifier.

42. The control circuit of claim 40 wherein the regulator includes a time based multiplier, the time based multiplier having a factor that determines to what degree the at least one command signal is reduced.

43. The control circuit of claim 40 wherein the desired position is a known position halfway between two stator poles.

44. The control circuit of claim 40 wherein the desired position is an aligned position where the rotor pole is aligned with a stator pole.

* * * * *